(12) United States Patent
Marceau et al.

(10) Patent No.: US 10,639,960 B2
(45) Date of Patent: May 5, 2020

(54) AIR DISTRIBUTION DUCT FOR MOTOR VEHICLE

(71) Applicant: RENAULT s.a.s., Boulogne Billancourt (FR)

(72) Inventors: Thierry Marceau, Rueil Malmaison (FR); Alban Le-Leizour, Maule (FR); Christophe Bertrand, Vacheresse les Basses (FR)

(73) Assignee: RENAULT s.a.s., Boulogne Billancourt (FR)

( * ) Notice: Subject to any disclaimer, the term of this patent is extended or adjusted under 35 U.S.C. 154(b) by 0 days.

(21) Appl. No.: 14/763,955

(22) PCT Filed: Jan. 27, 2014

(86) PCT No.: PCT/FR2014/050147
§ 371 (c)(1),
(2) Date: Jul. 28, 2015

(87) PCT Pub. No.: WO2014/114897
PCT Pub. Date: Jul. 31, 2014

(65) Prior Publication Data
US 2015/0367706 A1 Dec. 24, 2015

(30) Foreign Application Priority Data

Jan. 28, 2013 (FR) .................... 13 50685

(51) Int. Cl.
*B60H 1/00* (2006.01)
*B60H 1/24* (2006.01)

(52) U.S. Cl.
CPC ......... *B60H 1/00564* (2013.01); *B60H 1/242* (2013.01)

(58) Field of Classification Search
CPC .................................................. B60H 1/00564
(Continued)

(56) References Cited

U.S. PATENT DOCUMENTS 5,186,237 A * 2/1993 Adasek ............. B60H 1/00064
165/101
6,616,523 B1 * 9/2003 Tani ....................... B60H 1/247
454/137

(Continued)

FOREIGN PATENT DOCUMENTS

FR    2 914 733 A1    10/2008

OTHER PUBLICATIONS

International Search Report dated Mar. 13, 2014, in PCT/FR2014/050147, filed Jan. 27, 2014.
(Continued)

*Primary Examiner* — Steven B McAllister
*Assistant Examiner* — Allen R Schult
(74) *Attorney, Agent, or Firm* — Oblon, McClelland, Maier & Neustadt, L.L.P.

(57) ABSTRACT

An air distribution duct configured to be connected to a heating and/or air-conditioning device of a motor vehicle, the air distribution duct including: a connection end configured to be connected to the heating and/or air conditioning device; a closed other end; a longilinear main branch with one end which forms the closed end and the other end which forms the connection end, one face of the main branch being pierced with one or a number of orifices; at least one other orifice situated on a secondary branch one end of which is connected to the main branch and the free other end of which is closed, the at least one other orifice being on a face situated on a same side of the duct as the other orifices of the main branch.

16 Claims, 1 Drawing Sheet

Figure 1:
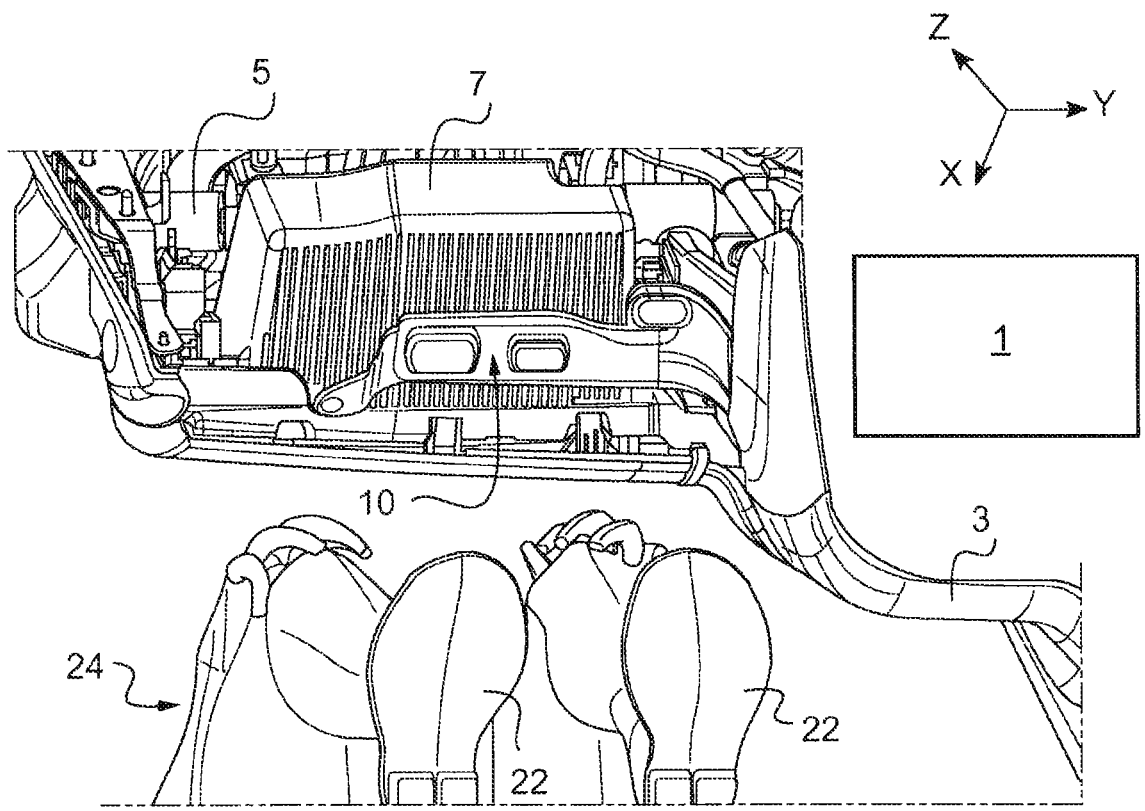

(58) Field of Classification Search
USPC .......................................................... 454/143
See application file for complete search history.

(56) References Cited

U.S. PATENT DOCUMENTS

| | | | | |
|---|---|---|---|---|
| 6,932,693 | B2* | 8/2005 | Nakagawa | B60H 1/247 |
| | | | | 454/137 |
| 7,361,082 | B2* | 4/2008 | Nilsson | A61G 13/108 |
| | | | | 454/187 |
| 7,481,454 | B2* | 1/2009 | Sunabashiri | B60R 21/213 |
| | | | | 280/730.2 |
| 2007/0044492 | A1* | 3/2007 | Ichikawa | B60H 1/00378 |
| | | | | 62/239 |
| 2007/0184770 | A1 | 8/2007 | Shibata et al. | |
| 2010/0199699 | A1* | 8/2010 | Lummitsch | B60H 1/00557 |
| | | | | 62/285 |
| 2011/0009045 | A1* | 1/2011 | Beckley | B60H 1/00564 |
| | | | | 454/162 |
| 2013/0207420 | A1* | 8/2013 | Kumar | B62D 25/06 |
| | | | | 296/217 |

OTHER PUBLICATIONS

French Preliminary Search Report dated Sep. 26, 2013, in Patent Application No. FR 1350685, filed Jan. 28, 2013 (with English Translation of Category of Cited Documents).

* cited by examiner

AIR DISTRIBUTION DUCT FOR MOTOR VEHICLE

The invention relates to an air distribution duct for a motor vehicle, in particular an air distribution duct inside the passenger compartment of a motor vehicle.

Such an air distribution duct is connected to a motor-vehicle heating and/or air-conditioning device and opens into the inside of the passenger compartment in order to heat or cool this latter. The invention relates more specifically to an air distribution duct designed to open out beneath the dashboard, above the feet of an occupant of the vehicle.

The air distribution ducts commonly used have a longitudinal shape closed at the end of same, one face of same opposite the feet being pierced with a plurality of orifices enabling airflow, usually two or three. Such distribution ducts usually have a rectilinear portion that extends substantially in the transverse direction of the vehicle, and a portion that can be curved for connection to the heating and/or air-conditioning device. This type of duct is usually made cheaply using the extrusion-blowing technique. However, it has been observed that the distribution of the airflow passing through each orifice of the duct is not optimal, with a greater flow passing through the orifice closest to the closed end, while the airflow passing through the orifice furthest away from the closed end is relatively low, and even inadequate. The air tends to move straight in the duct, which limits the quantity of air blown transversally by the orifice or orifices located upstream of the orifice closest to the closed end. This results in poor distribution of the air around the feet of the occupants of the vehicle.

There is therefore a need for an air distribution duct, in particular one intended to open out close to the feet of an occupant of the vehicle, that enables better distribution of the airflow between the orifices of same.

For this purpose, the invention relates to an air distribution duct designed to be connected to a heating and/or air-conditioning device of a motor vehicle, said air distribution duct having a connection end that can be connected to said heating and/or air-conditioning device and a closed other end, characterized in that the air distribution duct includes:
- a longilinear main branch one end of which forms the closed end and the other end of which forms the connection end of said duct, one face of said main branch being pierced with one or more orifices,
- at least one other orifice located on a secondary branch one end of which is connected to the main branch and the free other end of which is closed, said at least one other orifice being on a face located on the same side of said duct as the other orifices of the main branch.

Such a layout encourages a balanced distribution of the airflows coming from the different orifices of the air distribution duct. Indeed, the air conveyed by the connection end is distributed between firstly the main branch and secondly the secondary branch, this latter forming a cul-de-sac trap for the air in relation to the main branch, thereby forcing some of the air to escape through the orifice of the secondary branch. An increased quantity of air is therefore blown through the orifice of the secondary branch, even though same is located away from the closed end of the main branch. The same principle is also applied if the secondary branch has more than one air output orifice. Furthermore, the air distribution duct according to the invention can be made simply and cheaply, in particular by using a polymer material and the extrusion-blowing technique.

The air distribution duct according to the invention can advantageously comprise said main branch and said secondary branch only.

Advantageously, the main branch can be at least partially rectilinear, which makes it easier to make. Advantageously, the main branch is rectilinear between the closed end of same and the connection of same to the secondary branch, and the portion of same between the connection of same to the secondary branch and the connection end of same can be curved to facilitate the connection of same to the heating and/or air-conditioning device. However, more complex forms are also possible.

The secondary branch can also be rectilinear, although more complex forms are also possible.

The air distribution duct can also be fitted with attachment means to static elements of the vehicle, for example one or more attachment brackets. Advantageously, at least one attachment bracket is positioned beside the closed end of the air distribution duct.

Advantageously, a single other orifice is located on said secondary branch, which may help to further improve distribution of the airflows, in particular if the secondary branch is substantially the same length as the orifice. The orifice is then adjacent to the closed free end of the secondary branch. In other words, the orifice pierced in the secondary branch extends along the entire length of the secondary branch.

Advantageously but without limitation, the air distribution duct according to the invention may include one or more of the following features:
- the secondary branch extends along the main branch, which simplifies construction of the air distribution duct,
- the secondary branch is rigidly connected to the main branch along the entire length of same, thereby ensuring that the orifice located on the secondary branch remains in a position close to the orifices located on the secondary branch.

Advantageously but without limitation, the air distribution duct may have at least three orifices, at least two orifices pierced in the main branch and one orifice pierced in the secondary branch. For example, the air distribution duct may have an orifice pierced in the main branch and located close to the closed end of same, for example adjacent to that closed end, a single orifice pierced in the secondary branch and located close to the closed free end of same, for example adjacent to said closed free end, and another orifice pierced in the main branch and located between the two orifices described above.

Advantageously but without limitation, the secondary branch may be connected to the main branch between the orifice or orifices of the main branch and the connection end of same.

Advantageously, the different orifices may have the same dimensions, which may simplify construction of the air distribution duct. Orifices with different dimensions may nonetheless be used.

The position and number of orifices may nonetheless vary and may be determined as a function of the dimensions of the vehicle in question, with such a distribution duct opening out for example beneath the dashboard of the vehicle, above the feet of an occupant.

The orifices pierced in the main and secondary branches may advantageously open out on the same plane, to simplify construction. Where the air distribution duct is assembled in the vehicle, this plane may face the dashboard of the vehicle, being for example substantially parallel to this latter.

The invention also relates to a motor vehicle including a heating and/or air-conditioning device for the passenger compartment and at least one air distribution duct according to the invention connected to said heating and/or air-conditioning device and in which the orifices open into the inside of the passenger compartment, above the floor of the vehicle.

Advantageously but without limitation, the main branch of said at least one air distribution duct may extend substantially transversally inside the vehicle.

Figure 2:
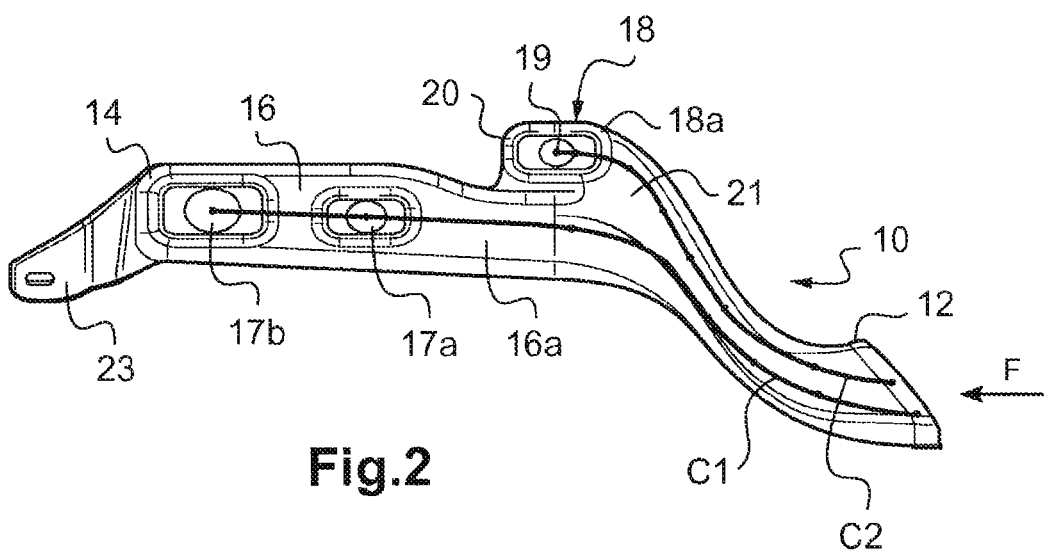

The invention is described below with reference to the attached drawings, which are non-limiting, in which:

FIG. 1 is a schematic perspective view of the portion of the dashboard of a motor vehicle located above the feet of an occupant and seen from the floor of a vehicle, the vehicle including an air distribution duct according to an embodiment of the invention, FIG. 2 is a schematic underneath view of the air distribution duct shown in FIG. 1.

In this description, the terms front, rear, top and bottom refer to the front and rear directions of the vehicle when the air distribution duct is mounted on the vehicle. The axes X, Y and Z correspond respectively to the longitudinal (from front to back), transverse and vertical axes of the vehicle.

Substantially horizontal, longitudinal or vertical means a direction/plane forming an angle not greater than ±20° or not greater than ±10° with a horizontal, longitudinal or vertical direction/plane.

FIG. 1 shows the front portion of the passenger compartment of a motor vehicle fitted with a heating and/or air-conditioning device 1 shown schematically. The dashboard 3 carried by the dashboard cross member 5 and a glove box 7 are also partially visible.

The vehicle also has an air distribution duct 10 linked to the heating and/or air-conditioning device 1.

This air distribution duct 10, shown in greater detail in FIG. 2, includes a connection end 12 that can be connected to said heating and/or air-conditioning device 1 and one closed other end 14.

The connection end 12 can in particular be shaped such as to enable same to be connected to the heating and/or air-conditioning device 1, or to fit the geometry of the vehicle in question.

The air distribution duct 10 is formed by a longilinear main branch 16 and a secondary branch 18 arranged in an approximate Y shape, the shared branch of which is located on the side of the connection end 12.

One of the ends of the main branch 16 forms the closed end 14 and the other end forms the connection end 12.

One face 16a of the main branch 16 is pierced with one or more orifices, two orifices 17a and 17b in the example shown.

The secondary branch 18 is connected to the main branch 16 on the side of the connection end 12 of same. This secondary branch 18 has a closed free end 20 and a connection end 21 to the main branch 16. The secondary branch 18 is pierced with an orifice 19 on the face 18a located on the same side of the air distribution duct 10 as the face 16a of the main branch 16.

In the embodiment shown, the secondary branch 18 extends along the main branch 16 and is rigidly connected to this latter along the entire length of same.

The main branch is substantially rectilinear between the closed end 14 of same and the connection of same to the secondary branch 18.

In the embodiment shown, the secondary branch 18 is substantially the same length as the sole orifice 19 of same.

The orifice 19 pierced in the secondary branch 18 therefore extends along the entire length of the secondary branch 18.

In the example shown, the secondary branch 18 extends along a length that is approximately one third of the length of the rectilinear part of the main branch 16.

The air distribution duct 10 shown in the figures therefore has three orifices: two orifices 17a, 17b pierced in the main branch 16, on a rectilinear portion of same, and an orifice 19 pierced in the secondary branch 18. One of the orifices 17b is located close to the closed end 14 of the main branch, the other orifice 17a being located between the orifice 17b and the orifice 19. These orifices open out on the same plane facing the dashboard of the vehicle (not shown) on which the feet 22 of an occupant 24 rest (FIG. 1). In other words, where the air distribution duct 10 is installed in the vehicle, the faces 16a and 18a of the main branch 16 and secondary branch 18 respectively face the dashboard of the vehicle. The air distribution duct 10 shown extends substantially transversally inside the vehicle. It can be attached to a static element of the vehicle, for example the underside of the glove box 7 shown, using an attachment bracket 23. This attachment bracket 23 is advantageously positioned beside the closed end 14 of the air distribution duct 10.

The air distribution duct 10 is advantageously made of a polymer material, for example polypropylene. Although it may be produced by molding, the cheaper method of extrusion-blowing is preferable.

The arrangement of the air distribution duct according to the invention makes it possible to improve the distribution of airflows between the different orifices 17a, 17b, 19, the trajectory of these airflows being shown schematically in FIG. 2 by lines C1, C2, and the direction of the airflow being shown schematically by the arrow F.

The invention claimed is:

1. An air distribution duct configured to be connected to a heating and/or air-conditioning device of a motor vehicle, the air distribution duct comprising:
   a connection end including an opening and configured to be connected to the heating and/or air-conditioning device;
   a closed end;
   a longilinear main branch extending in a transverse direction and including one end which forms the closed end and an other end which forms the connection end, one face of the main branch being pierced with a plurality of orifices comprising a first orifice provided at said closed end, and a second orifice located upstream of said first orifice in a direction of air flow from the connection end toward the closed end;
   a single branch extending from the main branch, wherein the single branch is a secondary branch extending from a shared portion of the main branch, the secondary branch and the main branch being positioned on opposite sides of a common wall, with one end of the secondary branch connected to the main branch and a free other end that is closed, the secondary branch including at least one other orifice on a face located on a same side of the duct as the plurality of orifices of the main branch, the at least one other orifice located on the secondary branch is positioned above the first orifice and the second orifice of the main branch in a vertical direction; and
   an attachment bracket positioned extending outward from the closed end, the opening of the connection end and the attachment bracket forming opposite ends of the air distribution duct in a longitudinal direction, wherein the secondary branch is located between said connection end and said second orifice and airflow traveling through the air distribution duct from the heating and/or air conditioning device is distributed to the first and second orifice of the main branch and the other orifice of the secondary branch, and wherein the orifices pierced in the main and secondary branches open out on a same plane and the attachment bracket and the connection end extend in front of the plane in the longitudinal direction.

2. The air distribution duct as claimed in claim 1, wherein the at least one other orifice comprises only a single orifice located on the secondary branch.

3. The air distribution duct as claimed in claim 2, wherein the secondary branch is as long as the single other orifice.

4. The air distribution duct as claimed in claim 1, wherein the secondary branch extends along the main branch.

5. The air distribution duct as claimed in claim 1, wherein the secondary branch is rigidly connected to the main branch along an entire length of the secondary branch.

6. The air distribution duct as claimed in claim 1, comprising at least three orifices, at least two orifices pierced in the main branch and a single orifice pierced in the secondary branch.

7. The air distribution duct as claimed in claim 1, wherein the secondary branch is connected to the main branch between all of the plurality of orifices of the main branch and the connection end.

8. A motor vehicle comprising a heating and/or air-conditioning device for the passenger compartment and at least one air distribution duct as claimed in claim 1 connected to the heating and/or air-conditioning device and in which the orifices open into inside of the passenger compartment, above a floor of the vehicle.

9. The motor vehicle as claimed in claim 8, wherein the main branch of the at least one air distribution duct extends transversely inside the vehicle.

10. The air distribution duct claimed in claim 1, wherein the secondary branch is located between the second orifice of the main branch and the connection end of the main branch.

11. The air distribution duct claimed in claim 1, wherein the second orifice of the main branch is smaller than the first orifice of the main branch.

12. The air distribution duct claimed in claim 1, wherein the secondary branch is rectilinear.

13. The air distribution duct claimed in claim 1, wherein the main branch is rectilinear between the closed end of the main branch and a connection of the main branch to the secondary branch.

14. The air distribution duct claimed in claim 13, wherein the secondary branch extends along a length that is one-third of a length of the main branch from the connection to the secondary branch and the closed end of the main branch.

15. The air distribution duct claimed in claim 1, wherein the secondary branch is rectilinear.

16. The air distribution duct claimed in claim 1, wherein the common wall of the air distribution duct is substantially parallel to the airflow in the main branch and the secondary branch located adjacent to the wall.

\* \* \* \* \*